US012808979B2

(12) United States Patent
Zarudniev et al.

(10) Patent No.: US 12,808,979 B2
(45) Date of Patent: Nov. 24, 2026

(54) PULSE RADAR BASED ON A HYBRID, PULSED AND FREQUENCY-MODULATION APPROACH

(71) Applicant: COMMISSARIAT A L'ENERGIE ATOMIQUE ET AUX ENERGIES ALTERNATIVES, Paris (FR)

(72) Inventors: Mykhailo Zarudniev, Grenoble (FR); Laurent Ouvry, Grenoble (FR); Cédric Dehos, Grenoble (FR); Gilles Masson, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 140 days.

(21) Appl. No.: 18/987,636

(22) Filed: Dec. 19, 2024

(65) Prior Publication Data

US 2025/0199116 A1 Jun. 19, 2025

(30) Foreign Application Priority Data

Dec. 19, 2023 (FR) ................................ FR2314484

(51) Int. Cl.
*G01S 7/32* (2006.01)
*G01S 7/282* (2006.01)
*G01S 13/26* (2006.01)

(52) U.S. Cl.
CPC ................ *G01S 7/32* (2013.01); *G01S 7/282* (2013.01); *G01S 13/26* (2013.01)

(58) Field of Classification Search
CPC ............. G01S 7/282; G01S 7/32; G01S 13/26
USPC ........................................................ 342/204
See application file for complete search history.

(56) References Cited

U.S. PATENT DOCUMENTS

| | | | |
|---|---|---|---|
| 2002/0190894 | A1 | 12/2002 | Mitsumoto et al. |
| 2005/0156779 | A1 | 7/2005 | Wixforth |
| 2009/0085796 | A1 | 4/2009 | Kuroda et al. |

FOREIGN PATENT DOCUMENTS

| | | | |
|---|---|---|---|
| DE | 911 663 | C | 5/1954 |
| EP | 3 790 188 | A1 | 3/2021 |
| FR | 3 015 153 | A1 | 6/2015 |
| FR | 3 099 910 | A1 | 2/2021 |

OTHER PUBLICATIONS

Stickley, et al., "Gated stepped-frequency ground penetrating radar", Journal of Applied Geophysics, vol. 43, Issues 2-4, pp. 259-269, Mar. 2000.

(Continued)

*Primary Examiner* — Brady W Frazier
(74) *Attorney, Agent, or Firm* — BakerHostetler

(57) ABSTRACT

A radar device includes a transmit channel for generating a radar signal; and a receive channel for receiving and demodulating echoes; the channels including a shared local oscillator having a frequency that varies as a function of a control signal; a generator of the control signal, so that the frequency of the local oscillator varies in time linearly or stepwise linearly; and means for generating transmit pulses and demodulation pulses; the receive channel including a mixer for receiving as input the echoes and the demodulation pulses and delivering as output a mixing signal, and a low-pass filter for extracting the first harmonic component of the mixing signal and an analog-to-digital converter.

12 Claims, 11 Drawing Sheets

(56) References Cited

OTHER PUBLICATIONS

Eisenburger, et al., "Stepped-Frequency Radar System in Gating Mode: An Experiment as a New Helicopter-Borne GPR System for Geological Applications", IGARSS 2008—2008 IEEE International Geoscience and Remote Sensing Symposium, 2008.
Inaba, "Interference suppression in FMICW radar with staggered pulse repetition interval", Electronics and Communications in Japan (Part I: Communications), vol. 90, No. 12, 2007.
Antide, et al., "Comparative Study of Radar Architectures for Human Vital Signs Measurement", 2020 IEEE Radar Conference (RadarConf20), 2020.
Liu, et al., "A 680 μW Burst-Chirp UWB Radar Transceiver for Vital Signs and Occupancy Sensing up to 15m Distance", 2019 IEEE International Solid-State Circuits Conference—(ISSCC), 2019.
Siligaris, et al., "Fast Chirping 58-64 GHz FMCW Radar Transceiver using D-PROT Multiplier in CMOS 45nm RFSOI for Vital Signs Detection", ESSCIRC 2023—IEEE 49th European Solid State Circuits Conference (ESSCIRC), 2023.
Andersen, et al., "118-mW Pulse-Based Radar SoC in 55-nm CMOS for Non-Contact Human Vital Signs Detection", IEEE Journal of Solid-State Circuits, vol. 52, Issue: 12, pp. 3421-3433, Dec. 2017.
Bechthum et al., "A 380 μW IEEE 802.15.4z IR-UWB pulse-mixing transmitter featuring enable-locking RFDCO with extensive duty-cycling in 22nm FDSOI," ESSCIRC 2023—IEEE 49th European Solid State Circuits Conference (ESSCIRC), pp. 45-48, 2023.
Singh et al., "An IR-UWB IEEE 802.15.4z Compatible Coherent Asynchronous Polar Transmitter in 28-nm CMOS," IEEE Journal of Solid-State Circuits, vol. 56, No. 12, pp. 3799-3810, Dec. 2021.

PULSE RADAR BASED ON A HYBRID, PULSED AND FREQUENCY-MODULATION APPROACH

CROSS-REFERENCE TO RELATED APPLICATION

This application claims priority to foreign French patent application No. FR 2314484, filed on Dec. 19, 2023, the disclosure of which is incorporated by reference in its entirety.

FIELD OF THE INVENTION

The invention relates to the field of radars, and more particularly SoC radars (SoC standing for system-on-chip) that are in particular usable to measure vital signs of a patient or as a presence detector—see for example (Antide 2020). These radars must have both a high spatial resolution (of the order of a few centimeters) and a low power consumption (a few tens of mW).

BACKGROUND

A technique commonly used in these applications is the FMCW-DC technique (FMCW-DC standing for frequency-modulated continuous-wave duty-cycled)-see for example (Liu 2019) and (Siligaris 2023). Specifically, this technique exploits the principle of compression of a wave transmitted with a wide bandwidth to a narrow intermediate-frequency bandwidth, this making it possible to use analog-to-digital converters (ADC) having a relatively low acquisition rate, a few MSps or tens of MSps (1 MSps=$10^6$ samples per second—MSps standing for mega samples per second). However, in the presence of targets having very diverse radar cross sections (RCS), it would be necessary to use ADCs having a high dynamic range, for example 9 to 12 bits or more, and therefore a relatively high power consumption.

An alternative is to use the IR-UWB technique (IR-UWB standing for impulse-radio ultrawide-band), in which a short pulse is emitted and the time of flight of its echo is measured to determine the distance of the target. See for example (Andersen 2017). One advantage of this technique is that, as the echo signals are separated in time, it is possible to apply automatic gain control (AGC) to make possible acquisition of a highly contrasted environment in the presence of objects of very diverse RCS while limiting the dynamic range of the ADCs. In contrast, obtaining a good spatial resolution depends on use of a high acquisition rate, several GSpS (1 GSps=$10^9$ samples per second—GSps standing for giga samples per second).

US 2002/0190894 discloses a radar system using a voltage-controlled oscillator driven to generate a signal having a linear frequency drift. Radar pulses are extracted from this signal, and the latter is used to demodulate their echoes. The demodulated signal is converted to digital format and processed to extract time-of-flight information of the radar pulses therefrom. One drawback of this technique is that it requires fast analog-to-digital converters.

(Eisenburger 2008) discloses an airborne stepped-frequency radar in which, for each frequency step, one transmit pulse and one receive demodulation pulse are generated, there being no temporal overlap between the two. This is merely intended to prevent antenna coupling.

SUMMARY OF THE INVENTION

The invention aims to overcome, in whole or in part, the aforementioned drawbacks of the prior art. More particularly, it aims to make it possible to use ADCs having a lower dynamic range than in FMCW-DC radars and a lower acquisition rate than in IR-UWB radars, without however sacrificing either spatial resolution, or dynamic range in respect of the RCSs of the targets detectable.

According to the invention, this aim is achieved by virtue of a hybrid approach combining the use of a pulsed radar signal and the principle of frequency modulation. More particularly, the invention uses a radar signal made up of a series of transmit pulses in which the frequency of the carrier varies, for example linearly, from one pulse to another. Demodulation pulses, generated at the same time as the transmit pulses by a shared local oscillator, are used to demodulate the echoes of the transmit pulses. The demodulation signal, which is obtained by mixing the echoes of the transmit pulses forming the radar signal and a demodulation pulse, is filtered to extract a first harmonic component therefrom, which is then converted into digital format with a view to extracting time-of-flight information therefrom. Since the radar signal is pulsed, the echo signals are separated in time, as in the case of the IR-UWB technique, allowing gain control, which permits use of ADCs of relatively low dynamic range even in the presence of a contrasted environment. Furthermore, because the first harmonic component of the demodulation signal is extracted using a suitably dimensioned low-pass filter, the acquisition rate of the ADC depends on the pulse repetition frequency and not on the spatial resolution; it may therefore be lower than in the conventional IR-UWB technique. Advantageously, the technique of the invention is compatible with use of frequency scrambling, with use of scrambling of pulse repetition period and/or with use of phase scrambling, this being desirable in particular for safety reasons (immunity to interference and electromagnetic attacks).

Thus, one subject of the invention is a radar device, comprising:

- a transmit channel configured to generate a radar signal; and
- a receive channel configured to receive echoes of said radar signal and to demodulate them synchronously with their generation so as to extract time-of-flight information therefrom;

in which device the transmit channel and the receive channel comprise:

- a shared local oscillator having a frequency that varies as a function of a control signal;
- a generator of said control signal, configured so that the frequency of said local oscillator varies in time linearly, or indeed varies stepwise linearly from one pulse to another, or indeed takes a plurality of discrete values obtainable by scrambling a stepwise linear variation from one pulse to another; and
- means for shaping a signal generated by said local oscillator at said variable frequency, said means being configured to generate a series of transmit pulses forming said radar signal and a corresponding series of receive demodulation pulses, each receive demodulation pulse having a duration greater than or equal to the duration of the corresponding transmit pulse and defining a respective time range of echo reception;
- said receive channel further comprising a mixer configured to receive as input said echoes of said radar signal and one of said receive demodulation pulses and to deliver as output a mixing signal;

characterized in that:

- said receive channel also comprises a low-pass filter configured to filter said mixing signal by extracting its first harmonic component and an analog-to-digital converter for converting the filtered mixing signal to digital format.

BRIEF DESCRIPTION OF THE DRAWINGS

Other features, details and advantages of the invention will become apparent on reading the description given with reference to the appended drawings, which are given by way of example and in which, respectively:

FIG. 6A: in-phase component before filtering; FIG. 6B: filtered in-phase component; FIG. 6C: quadrature component before filtering; FIG. 6D: filtered quadrature component];

DETAILED DESCRIPTION

Figure 1:
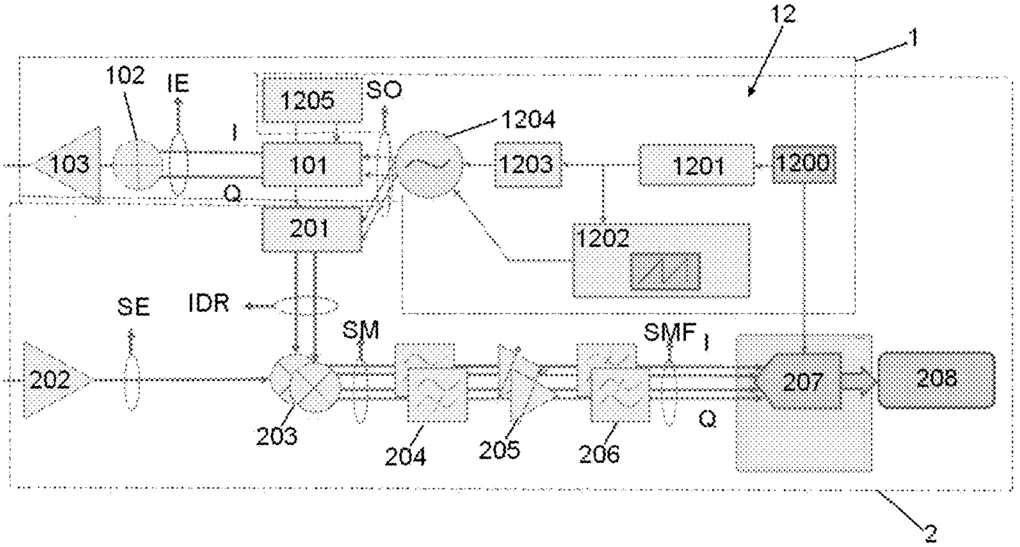
FIG. 1 shows the functional schematic of a device according to a first embodiment of the invention.

The radar device of FIG. 1 is composed of a transmit channel 1, for generating a radar signal made up of what are referred to as transmit pulses IE, and of a receive channel 2, for receiving echoes of these pulses reflected by targets and processing them so as to extract therefrom time-of-flight information. These two channels have shared components 12.

The components shared between the transmit channel and the receive channel comprise a clock 1200 generating a clock signal of the device, which defines the repetition period PRP of the transmit pulses. Optionally, a time scrambler 1201 introduces pseudo-random variations into this repetition period; the interval between the transmit pulse of rank n and the next transmit pulse is then designated $PRP_n$ (see FIG. 2). In this case, it is the smallest possible PRP that determines the maximum target distance that can be measured.

The clock signal, which may be time scrambled, drives a device 1203 for triggering a frequency-controlled local oscillator 1204. On each clock signal, the device 1203 restarts the local oscillator 1204, then stops it before the arrival of the next clock signal. The initial phase of the oscillator 1204 is the same on each restart. Its oscillation frequency for its part varies linearly from one restart to another. This is made possible by a generator 1202 of a control signal of the oscillator, which is driven by the (possibly time scrambled) clock signal. In contrast, the frequency of the local oscillator remains constant between when it is triggered and stopped. Generally, the frequency of the local oscillator is preferably in the microwave range. What is meant by that is frequencies between 300 MHz and 300 GHz or, more restrictively, the range 1 GHz to 100 GHz.

Figure 2:
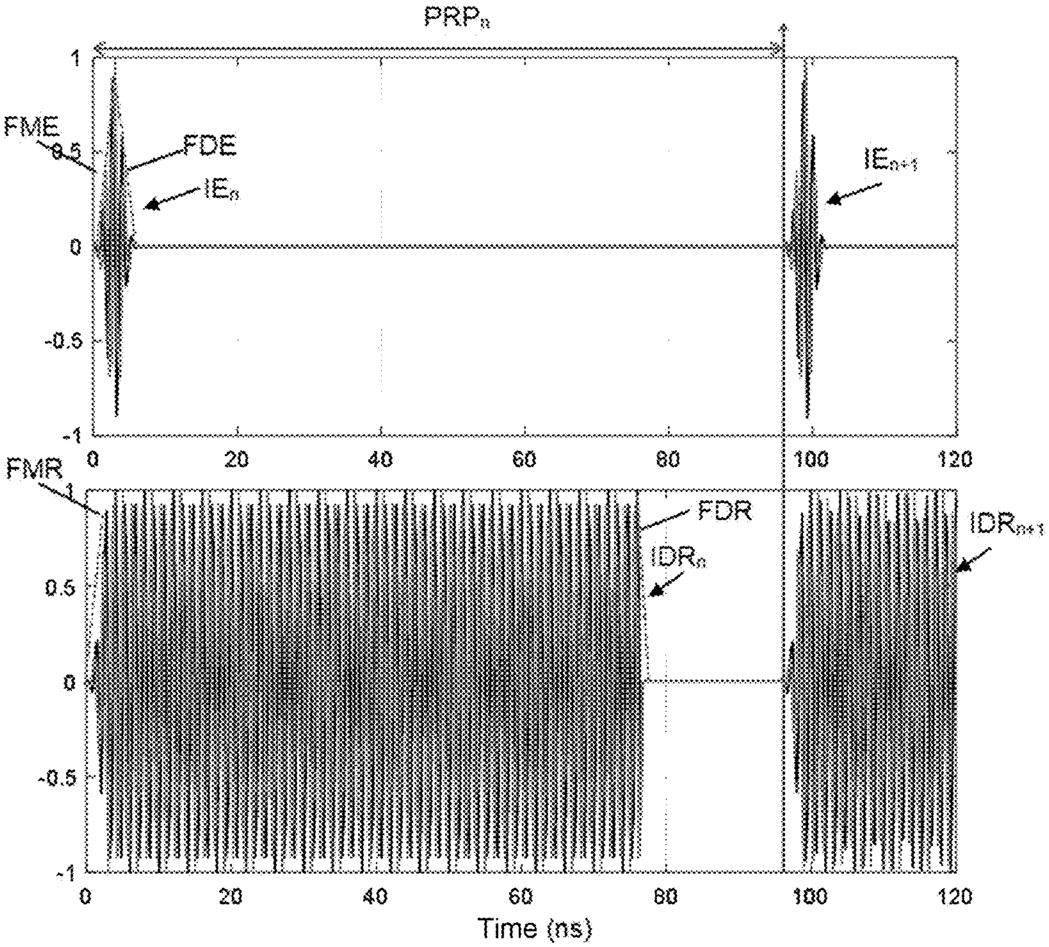
FIG. 2 shows transmit pulses and the corresponding receive demodulation pulses.

The oscillator signal SO generated by the local oscillator 1204—which has an in-phase component I and a quadrature component Q—is delivered as input to a first pulse shaper 101 belonging solely to the transmit channel 1, which pulse shaper is configured to generate, each time the local oscillator is triggered, a transmit pulse IE typically having a duration of the order of a few nanoseconds (ns). The top part of FIG. 2 illustrates a transmit pulse $IE_n$ comprising a rising edge FME and a falling edge FDE, followed—after an interval PRP—by another transmit pulse $IE_{n+1}$. The latter has an envelope identical to that of $IE_n$, but a carrier of different frequency, as explained above.

The I and Q components of the transmit pulses IE are combined by a combiner 102, then delivered as input to a power amplifier 103 to then be transmitted by an antenna (not shown).

The oscillator signal SO is also delivered as input to a second pulse shaper 201 belonging solely to the receive channel 2, which pulse shaper is configured to generate, each time the local oscillator is triggered, what is referred to as a "receive demodulation" pulse IDR, preferably of a duration substantially longer (e.g. by at least a factor of 10) than that of the transmit pulses IE. The duration of the pulse IDR sets an upper limit of the pulse repetition frequency and determines the acquisition "depth", i.e. the maximum target distance that can be detected.

According to one advantageous aspect of the invention, separate functions are used to shape the transmit and receive pulses. Specifically, the transmit shaper preferably defines a baseband envelope, but may also define a baseband shape (the latter including a notion of sign), and may drive a digital power amplifier. The receive shaper, for its part, often performs on-off keying of the oscillator synchronized with the frequency variation of the local oscillator.

The local oscillator, in contrast, is shared between transmit and receive.

The bottom of FIG. 2 illustrates a receive demodulation pulse $IDR_n$ comprising a rising edge FMR and a falling edge FDR, followed—after an interval PRP—by another receive demodulation pulse $IDR_{n+1}$. The latter has an envelope identical to that of $IDR_n$, but a carrier of different frequency, as explained above. In contrast, the carriers of the receive demodulation pulses $IDR_n$, $IDR_{n+1}$ are identical to those of the corresponding transmit pulses $IE_n$, $IE_{n+1}$.

A phase scrambler 1205 may optionally be provided to apply identical polarity inversions, in a pseudo-random sequence, to the pulses IE and IDR. If the inversions are applied independently to the two quadratures of these pulses, the end result is QPSK modulation by a pseudo-random signal. As a variant, the scrambler 1205 may apply phase jumps able to take more than two values.

The pulses IDR are delivered as input to a mixer 203 that also receives, on another input, an echo signal SE picked up by an antenna (not shown) and amplified by a low-noise amplifier 202. Initially, the echo signal $SE_n$, which is mixed with the receive demodulation pulse $IDR_n$, is considered to have resulted from reflection of the transmit pulse $IE_n$ by a target at a distance d and therefore corresponds to a replica of said transmit pulse delayed by $\tau=2$ d/c, c being the speed of light. It will be understood that, under these conditions, the receive demodulation pulse defines a receive window for the echo signals.

Figure 3:
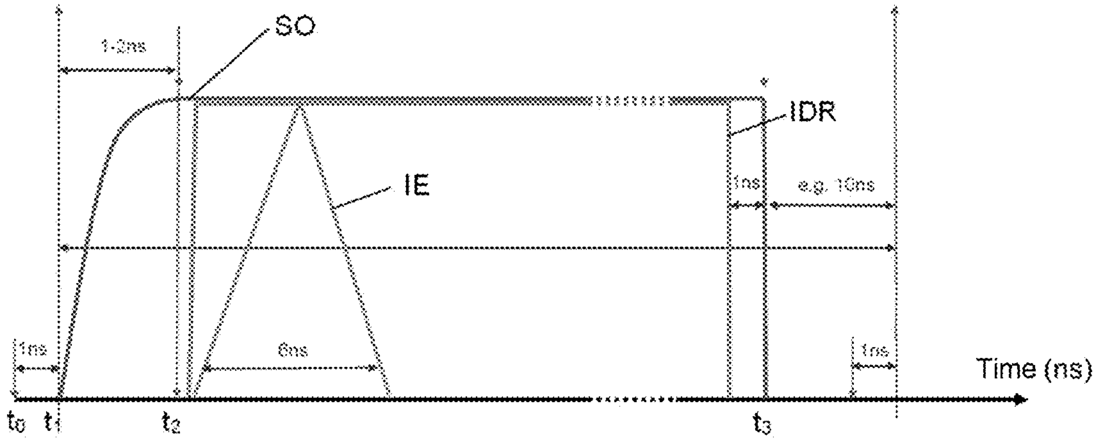
FIG. 3 shows a graph illustrating the temporal sequence of the transmit and receive demodulation pulses, and the signal generated by the local oscillator.

FIG. 3 illustrates the temporal sequence of the envelopes of the transmit and receive demodulation pulses IE, IDR, and the signal SO generated by the local oscillator. At an initial time to, the local oscillator 1204 receives the control signal, which defines its oscillation frequency, and then at a time $t_1$ about 1 ns later it receives a trigger signal which starts the oscillation. It will be noted that the amplitude of the signal SO gradually increases before stabilizing at a time $t_2$, and then remains at a constant value until the oscillator stops at a time $t_3$ several tens of nanoseconds later. Said stopping occurs about 10 ns before the arrival of the next trigger signal. The rising edges of the transmit pulses IE and receive demodulation pulses IDR start once the amplitude of the signal SO has stabilized. While the transmit pulse IE is very short (e.g. 6 ns), the receive demodulation pulse continues until just before (e.g. 1 ns before) the oscillator stops.

The mixing signal SM output by the mixer 203 is first filtered by an (optional) high-pass filter the purpose of which is to remove DC or very low-frequency components resulting from direct coupling between transmitter and receiver and other parasitic effects. Next, the signal is preferably amplified by a variable gain amplifier 205, which applies gain control to compensate for differences in the strength of the various received echoes. The variation may follow a predefined profile—for example, increasing in time because later echoes correspond to more distant targets and therefore to greater attenuation—or be adaptive.

The mixing signal SM then passes through a low-pass filter 206, with a passband of the order of a few MHz (depending on the frequency slope used in transmission and on the desired largest echo distance). The filtered mixing signal SMF output from the filter 206 is then sampled and converted to digital format by an analog-to-digital converter (ADC) 207. Given the low bandwidth of the filter 206, the converter 207 may have a relatively low acquisition frequency, for example 20 MSpS (1 MSpS=$10^6$ samples/second). The use of a variable gain amplifier makes it possible to limit the resolution of the converter—for example 12 bits—while maintaining an acceptable dynamic range.

The signal converted to digital format is lastly processed by a processor 208 in order to extract therefrom information on the time of flight of the echo signals. As will be explained later, this processing may consist in simply calculating a Fourier transform.

Figure 4:
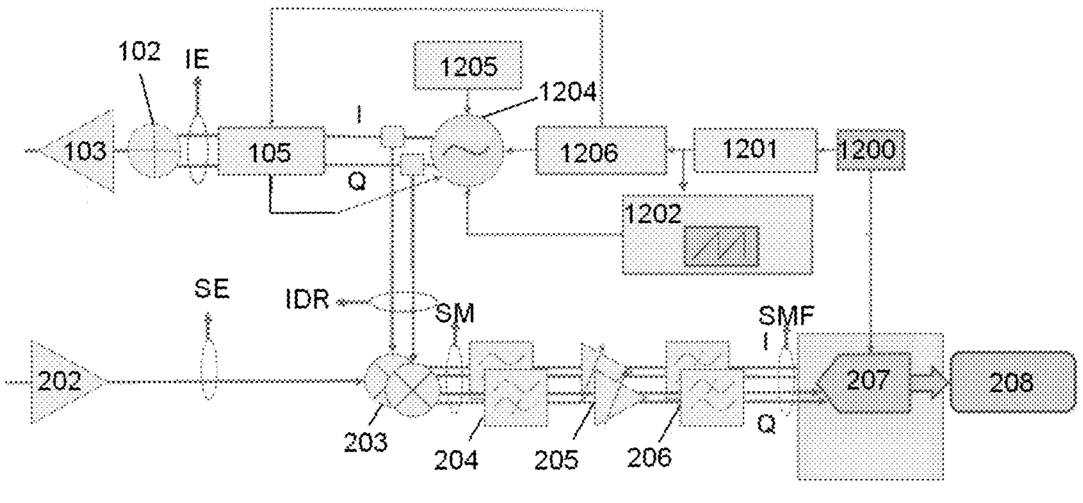
FIG. 4 shows the functional schematic of a device according to a second embodiment of the invention.

FIG. 4 shows the functional schematic of a device according to a second embodiment of the invention. This device differs from that of FIG. 1 in that the local oscillator 1204 is triggered by a device 1206 which, at the same time, shapes the rising edge of the pulses IE and IDR. The falling edge of the pulses IE is shaped by a device 105 that receives the oscillator signal as input, while the falling edge of the pulses IDR is simply defined by the oscillator stopping. In other words, the pulses are partially generated in baseband, instead of being generated entirely in the microwave domain as in the case of the first embodiment. However, spectrum control is more difficult.

Document FR 3 099 910 discloses a circuit that may be used to produce pulse shapers 101, 201 and 105. This circuit is compatible with binary phase scrambling.

Document FR 3 015 153 describes a triggered microwave oscillator the oscillation frequency of which is controlled, and which may be used to implement the local oscillator 1204.

Operation of the device of FIG. 1 and FIG. 4 will now be illustrated using an analytical model and numerical simulations.

First, a reference transmit pulse $p_0(t)$ is defined in baseband, the frequency characteristics of which are compatible with regulatory templates and the sought minimum bandwidth, and that has the shortest possible temporal support. For example, it is possible to use a Gaussian pulse defined by the expression:

$$p_0(t) = e^{-\frac{t^2}{T_p^2}} \tag{1}$$

where the duration parameter $T_p$ is related to the band $B_{x_{dB}}$ of the pulse by $$T_p = \frac{2\sqrt{-\ln\left(10^{\frac{x_{dB}}{20}}\right)}}{\pi \cdot B_{x_{dB}}} \tag{2}$$

$x_{dB}$ being the reference level used to measure the bandwidth $B_{x_{dB}}$. Typically, $x_{dB}$=−10 dB and $B_{x_{dB}}$=500 MHZ, this giving $T_p$~1.367 ns and an effective duration of the pulse at 99% of its amplitude equal to 4.292*$T_p$~5.867 ns. A substantially shorter pulse is possible, the order of magnitude to be retained in practice being $$\frac{2}{B_{-10_{dB}}}.$$

The reference transmit pulse is then shifted in the time domain so that its effective support is in $[0,\beta T_p]$, with for example $\beta$=4.292.

The case where the local oscillator 1204 is restarted on each pulse from the same initial time, with a phase conventionally set equal to 0 on each pulse initiation and a frequency updated on each pulse according to an upwardly rising linear ramp of slope $$\alpha = \frac{B_{chirp}}{T_{chirp}}$$

where $B_{chirp}$ IS the frequency excursion of the chirp and $T_{chirp}$ is the duration of the chirp, the frequency remaining constant between two restarts, will now be considered. The interval PRP will further be considered to remain constant between two restarts of the oscillator and to be equal to T; therefore, the number of pulses is $$N = \frac{T_{chirp}}{T}.$$

The receive demodulation pulse has a length equal to T and phase scrambling is not employed. The analytical expression of the transmitted radar signal, which takes the form of a sequence of transmit pulses, is therefore given by $$s(t)=\sum_{n=0}^{N-1} p_0(t-nT)e^{j\omega(n)(t-nT)} \tag{3}$$

with $$\omega(n)=\omega_m+\frac{n}{N}2\pi B_{chirp}=\omega_m+n2\pi\alpha T=\omega_m+n\alpha_r T$$

with $$\alpha_r=2\pi\alpha$$

The analytical expression of the sequence of receive demodulation pulses IDR is written $$LO_{Rx}(t)=\sum_{n=0}^{N-1} R_T(t-nT)e^{-j\omega(n)(t-nT)} \tag{4}$$

with $R_T(t)$ a unit rectangular time gate of duration T centered on $$\frac{T}{2}.$$

Considering the case of reflection of the radar signal by a single target at a distance d, the mixing signal SM output from the mixer is obtained by calculating the product of the radar signal delayed by τ=2d/c and of the signal $LO_{Rx}(t)$. The following is obtained:

$$SM(t)=s(t-\tau)\cdot LO_{Rx}(t)=\sum_{n=0}^{N-1} p_0(t-nT-\tau)e^{j\omega(n)(t-nT-\tau)}\sum_{n=0}^{N-1} R_T(t-nT)e^{-j\omega(n)(t-nT)} \tag{5}$$

There is considered to be no interference between consecutive PRPs, i.e. the transmit pulse $TE_n$ is received during receive demodulation pulse $TDR_n$, which assumes that $\tau+\beta.T_p<T$. Then:

$$SM(t)=\sum_{n=0}^{N-1} p_0(t-nT-\tau)R_T(t-nT)e^{j\omega(n)(t-nT-\tau)}e^{-j\omega(n)(t-nT)}= e^{-j\omega_m\tau}\sum_{n=0}^{N-1} p_0(t-nT-\tau)e^{-jnT.\alpha_r\tau} \tag{6}$$

The term on the left is a fixed phase term that may be neglected. The sum term is a pulse signal the phase of the consecutive pulses of which rotates with $\alpha_r\tau$, this amounting in the frequency domain to having a first harmonic at $$F_\tau=\frac{1}{2\pi}\frac{\Delta\varphi}{T}=-\alpha\tau.$$

The other frequency components are of period $$\frac{1}{T}$$

and therefore at $$\frac{k}{T}+F_\tau$$

for every relative integer k. The information on the distance of the object is therefore present in this first harmonic, which is extracted by the low-pass filter 206, which typically has a passband less than $$\frac{1}{T}.$$

The sampling rate of the analog-to-digital converter 207 is determined by this passband. In the presence of a number of echoes at different distances, an equal number of harmonics, which may or may not be resolved, is obtained.

Figure 5A:
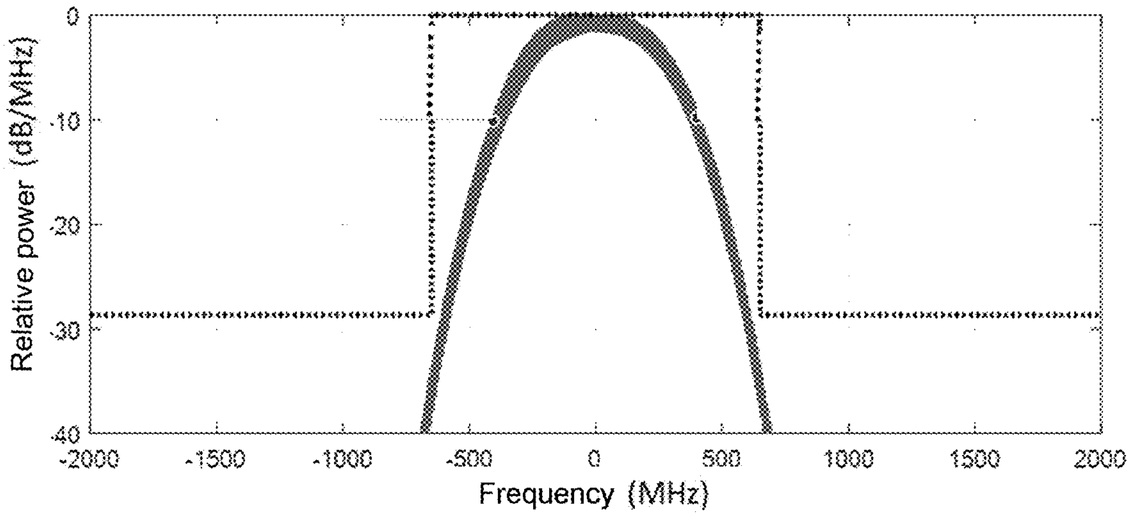
FIG. 5A shows the spectrum of a transmit signal.

FIG. 5A illustrates the power spectrum of a radar signal having a bandwidth of 500 MHz, a pulse repetition frequency of 10 MHz, and a chirp defined by $$\alpha=0.005\frac{\text{GHz}}{\mu\text{s}}.$$

The dashed line shows the spectral template that must be respected, and that actually is.

Figure 5B:
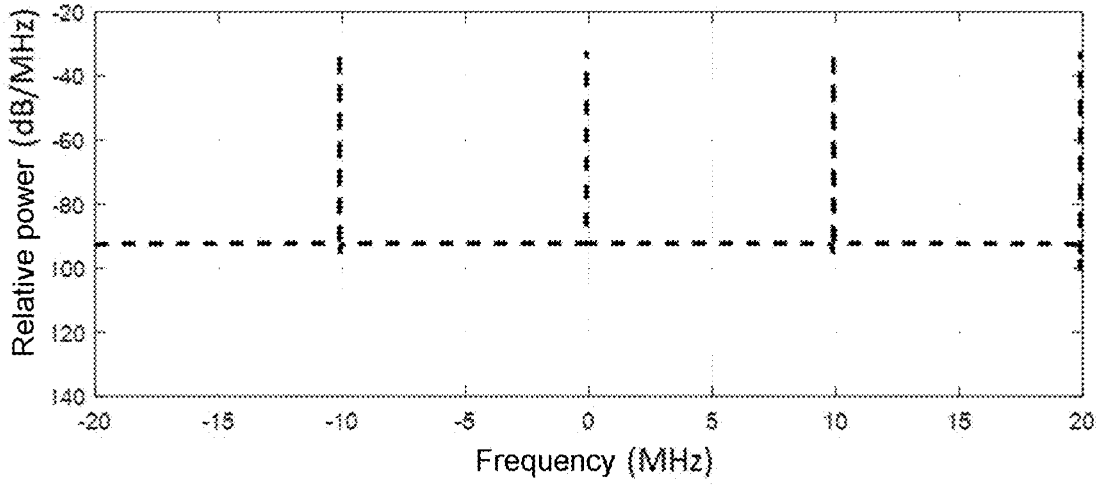
FIG. 5B and FIG. 5C show the spectrum of the receive mixing signal before and after low-pass filtering, respectively, in the presence of a single target.
Figure 5C:
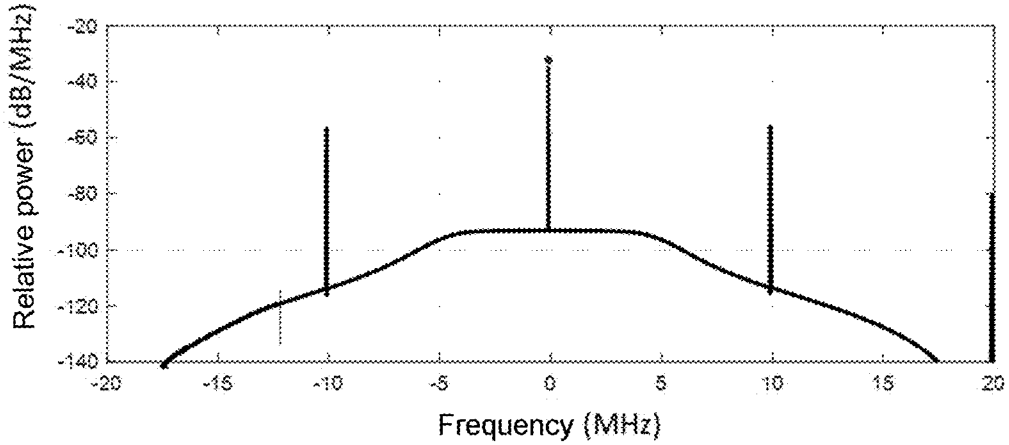
Figure 6A:
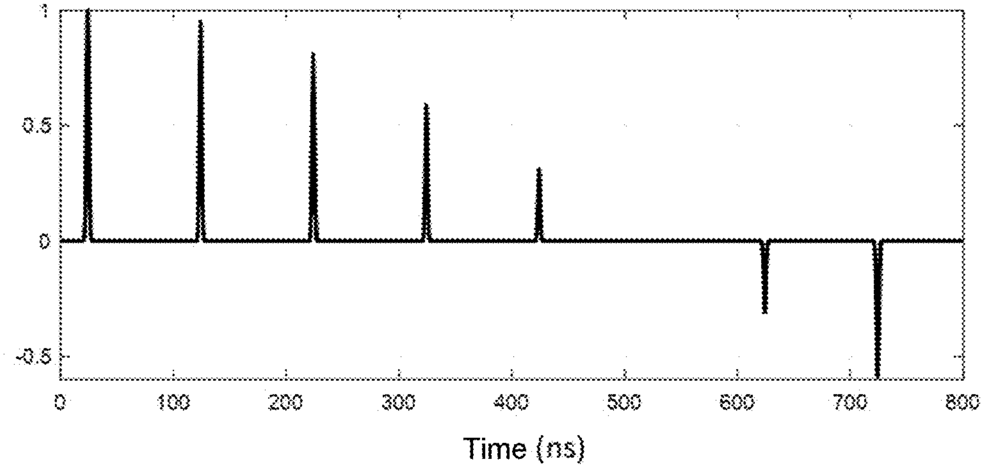
FIG. 6A, FIG. 6B, FIG. 6C and FIG. 6D show the mixing signal in the time domain in the presence of a single target before and after low-pass filtering
Figure 6B:
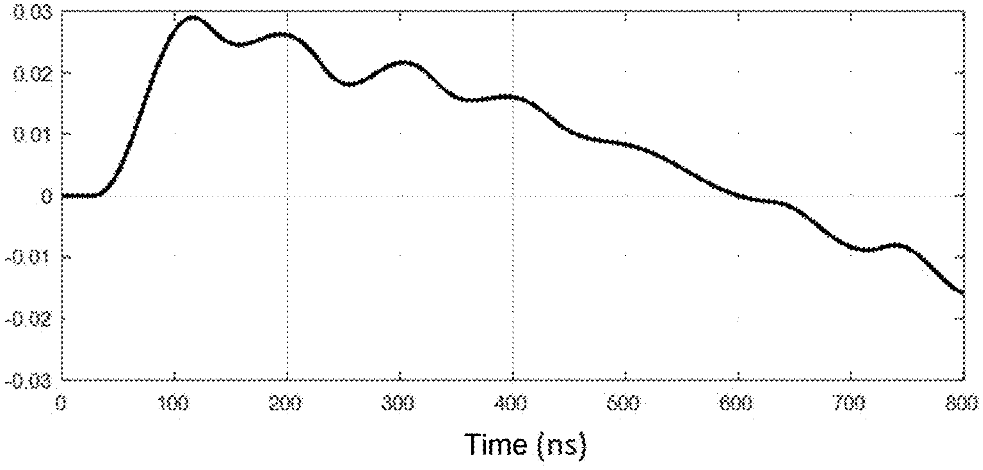
Figure 6C:
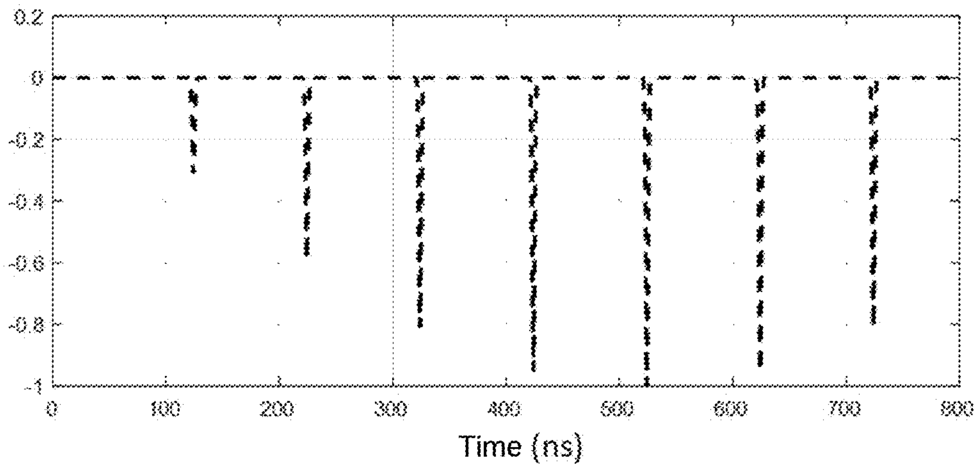
Figure 6D:
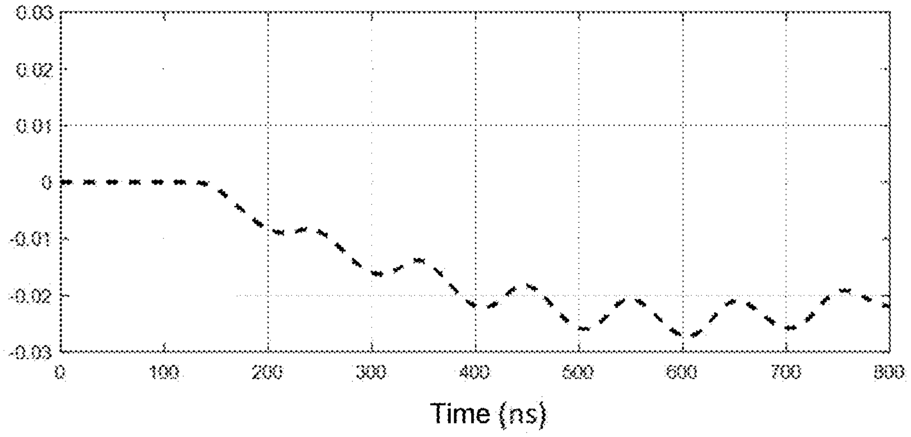

FIG. 5B illustrates the spectrum of the mixing signal SM in the presence of a target at a distance such that the delay t is equal to 20 ns. The presence of discrete harmonics will be noted, the lowest frequency harmonic of which is extracted by the low-pass filter 206. FIG. 5C shows the spectrum of the filtered signal SMF, in which higher order harmonics are attenuated by 20 dB or more, and therefore effectively removed. FIG. 6A and FIG. 6C show the I and Q components of the signal SM in the time domain, and FIG. 6B and FIG. 6D the I and Q components of the filtered signal SMF, respectively.

Figure 7A:
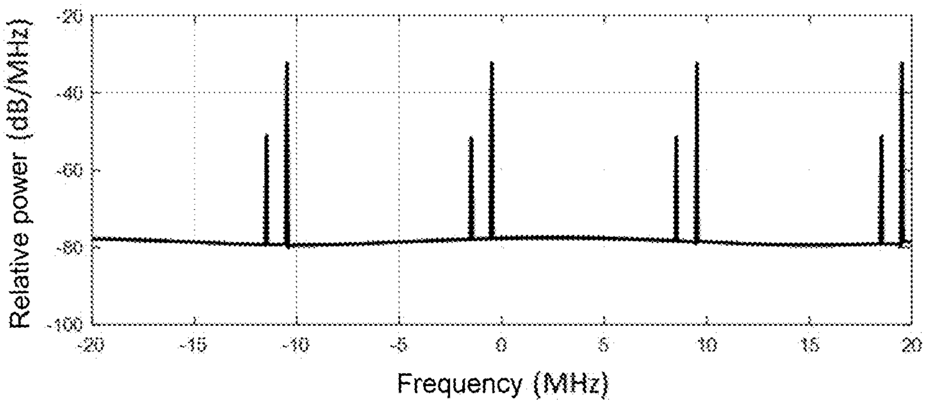
FIG. 7A, FIG. 7B, FIG. 7C, FIG. 7D show the spectrum of the receive mixing signal in the presence of two targets, respectively: unfiltered and without gain profiling (FIG. 7A); after low-pass filtering but without gain profiling (FIG. 7B); unfiltered but with gain profiling (FIG. 7C); after low-pass filtering and with gain profiling (FIG. 7C)
Figure 7B:
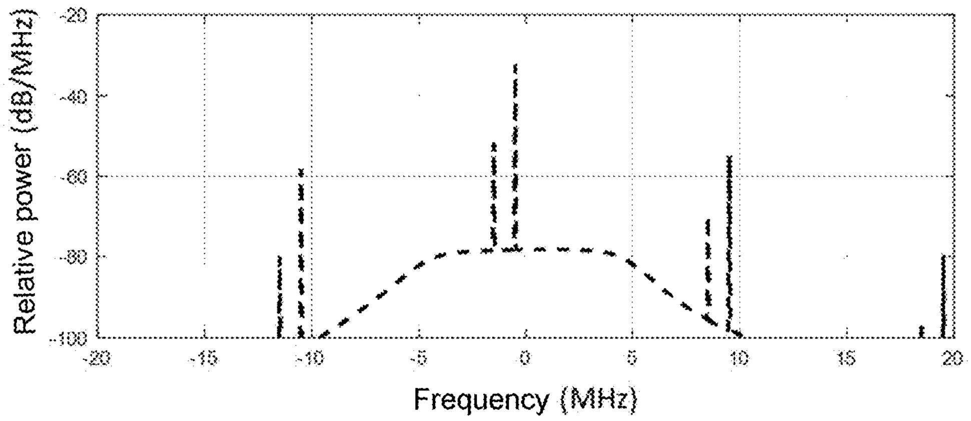
Figure 7C:
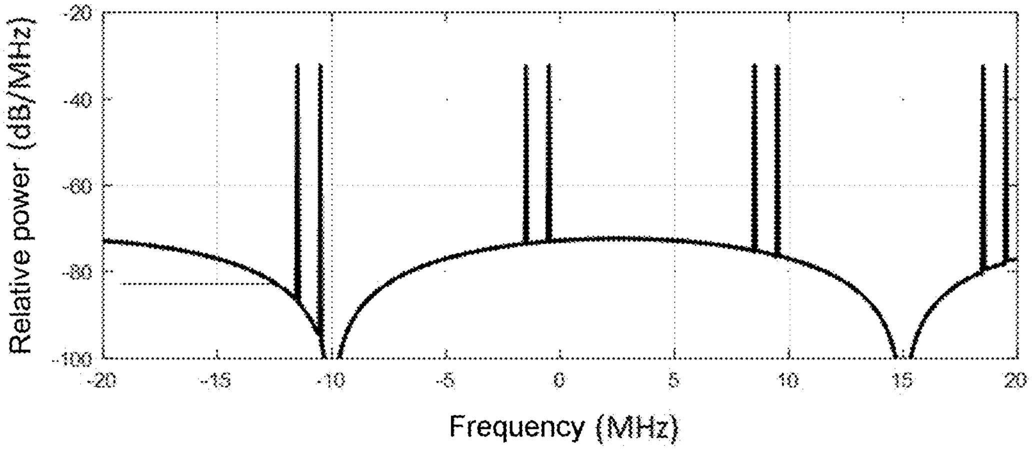
Figure 7D:
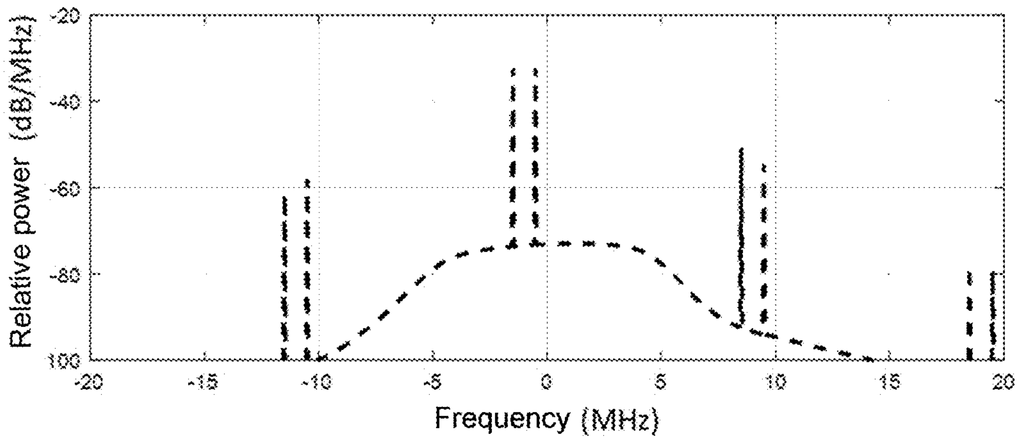

FIG. 7A and FIG. 7B show the spectra of the signals SM and SMF, respectively, in the case of two reflections at 20 ns and 60 ns with a power difference of 19 dB and in the absence of gain profiling. The doubling of the harmonics may be seen, but the component corresponding to the greatest delay is difficult to detect. As illustrated in FIG. 7C and FIG. 7D, the use of the amplifier 205 to apply automatic gain control compensates for the variations in the strength of the received echoes.

Certain assumptions of the analytical model may now be relaxed.

First, it is assumed that the condition that there is no interference between consecutive PRPs, i.e. $\tau+\beta T_p<T$, is not met. In this case, there is aliasing of the spectrum of the mixing signal, because an echo is demodulated by a signal of frequency different from that of its carrier.

First, it will be noted that $0<\tau<T$ is equivalent to $\alpha T\leq F_\tau<0$ and since $$\alpha=\frac{B_{chirp}}{NT}$$

it is true to write that $$\frac{B_{chirp}}{N} \leq F_\tau < 0.$$

There is therefore a degree of freedom offered by the bandwidth traced by the chirp between the covered intermediate frequency range (i.e. at the mixer output) and the PRF. In the example given above (PRF=10 MHz, α=0.025 GHz/μs and $B_{chirp}$=500 MHZ), N=200 and the minimum IF is −2.5 MHz or PRF/4, and harmonic filtering is possible because the lowest is at 7.5 MHz. If $B_{chirp}$=1 GHz then the minimum IF is −5 MHz and the lowest harmonic +5 MHz, which would require complex filtering.

Let the case (k+1)T>τ≥kT with k>1 be considered once again, assuming that no phase scrambling is employed. In this case, excluding the edge effect caused by "lost" pulses, the spectrum of the signal SM is "aliased" at $F_{\tau-kT}$. It may be verified that $$F_{\tau-kT} \neq F_\tau + \frac{k}{T}.$$

In other words, $F_\tau$ is not a continuous function of τ, it is not "conventional" spectral aliasing.

Let the case where (k+1)T>τ≥kT with k>1 be considered again, but this time let phase scrambling of BPSK type be employed. In this case, the descrambling sequence is misaligned since in the basic architecture it is synchronous with the scrambling sequence. Consequently, the pulses will not be summed coherently.

At this point, it is appropriate to enrich the model of the signal SM output by the mixer by taking into account BPSK scrambling and descrambling operations with the binary code b(n)∈{−1,1}:

$$SM(t) = \sum_{n=0}^{N-1} b(n)\cdot p_0(t-nT-\tau)e^{j\omega(n)(t-nT-\tau)} \sum_{n=0}^{N-1} \overline{b(n)}\cdot R_T(t-nT)e^{-j\omega(n)(t-nT)} \tag{7}$$

If 0≤τ<T, the operation is transparent:

$$SM(t) = s(t-\tau)\cdot LO_{Rx}(t) = \sum_{n=0}^{N-1} \underbrace{b(n)\overline{b(n)}}_{1}\cdot p_0(t-nT-\tau)e^{-j\omega(n)\tau} \tag{8}$$

$$SM(t) = \sum_{n=0}^{N-1} b(n)\overline{b(n+k)}\cdot p_0(t-nT-\tau)\, e^{-j\omega(n)(t-nT-\tau)} e^{j\omega(n+k)(t-(n+k)T)} \tag{9}$$

Since b(n) is ideally a white random process (sequence), then $E[b(n)\overline{b(n+k)}]=0$, ∀k≠0 and E[m(t)]=0 therefore by ergodicity m(t) is of zero mean. In practise, b(n) is not perfectly white and m(t) is akin to interfering noise spreading power throughout the band depending on the covariance of b(n).

In one embodiment allowing cases where (k+1)T>τ≥kT with k>1 to be processed it is necessary to parallelise the descrambling operation for all the desired values of k. In this case, it would be preferable to produce a receive demodulation pulse without phase scrambling, this requiring a minor modification of the architecture of FIG. 1 and FIG. 4, and perform the phase descrambling after the receive mixer by parallelizing the baseband pipeline and delaying by k values the descrambling sequence $\overline{b(n)}$. This is an additional option.

Lastly, there are overlapping PRP segments where the mixer output is corrupted: (kT−β$T_p$≤τ<kT) the received pulse being mixed with a discontinuous phase demodulation signal. This concerns by extension PRP segments in which the demodulation signal is deliberately turned off. A change of PRP may allow these "dead" zones to be processed.

The case of time scrambling (pseudo-random variations in the spacing between pulses) will now be considered. Numerical simulations have made it possible to verify that it has no impact on the frequency of the fundamental harmonic as long as the amplitude of spacing variation is not excessive.

The following assumption was made in respect of the restart of the local oscillator and its initial phase. In the proposed analytical model, the phase was reset to 0 (or to any constant value) on each pulse, regardless of the generated frequency. The analytical model clearly shows that if this assumption is made then the expression for the mixing signal becomes:

$$SM(t) = \sum_{n=0}^{N-1} p_0(t-nT-\tau)\, R_T(t-nT)e^{j\omega(n)(t-\tau)}e^{-j\omega(n)(t)} \tag{10}$$

This gives the same result, with the phase term cancelling out at the mixer output.

Lastly, the case where the frequency of the oscillator varies continuously and linearly, including during the generation of the pulses IE and IDR, which are therefore chirped, is of interest. The assumption of reset of the phase (there is therefore a discontinuity) at the beginning of each pulse is still made, though it will be relaxed later. It is then possible to write:

$$s(t) = \sum_{n=0}^{N-1} p_0(t-nT)e^{j\omega(n)(t-nT)} \tag{11}$$

$$LO_{Rx}(t) = \sum_{n=0}^{N-1} R_T(t-nT)e^{-j\omega(t)(t-nT)} \tag{12}$$

$$\text{with } \omega(t) = \omega_m + 2\pi\frac{B_{chirp}}{T_{chirp}}t = \omega_m + \alpha_r t$$

After mixing, the following is obtained (again making the other initial assumptions, including phase reset):

$$SM(t) = e^{-j\omega_m\tau}\sum_{n=0}^{N-1} p_0(t-nT-\tau)e^{-j\alpha_r\tau(2t-\tau-nT)} \tag{13}$$

If sampling such that t=nT+τ is considered, then:

$$m(t) \sim e^{-j\omega_m\tau}e^{-j\alpha_r\tau^2}\sum_{n=0}^{N-1} p_0(t-nT-\tau)e^{-j\alpha_r\tau nT} \tag{14}$$

This signal is therefore a sinusoid of frequency $F_\tau$=−ατ sampled by a finite comb of pulses spaced apart by T. The result is indeed a spectrum of frequency lines $$F_\tau(k) = -\alpha\tau + \frac{k}{T}$$

weighted by the spectrum of the pulse. The difference with the case considered above is due only to the variation in the frequency of the local oscillator during the duration of the pulse, which may be calculated: if the pulse lasts $\beta T_p$, the frequency changes by $\alpha\beta T_p$, i.e. 0.147 MHz with $\beta T_p$=5.867 ns and $\alpha$=0.025 GHz/μs and the difference is bounded by 0.3°. It may be seen that this difference is marginal given the bandwidths envisioned.

The notion of "phase continuity" deserves to be clarified especially since in most cases the LO signal is a real square signal. Its phase is therefore defined only at the times corresponding to its rising and falling edges, and therefore arbitrarily takes only two discrete values, which seems incompatible with any notion of "continuity". The phase must therefore be defined relative to a reference (thus the two discrete values are 0 and π) then either by considering the main harmonic (which makes it possible to determine the phase as argument of the sinusoid forming this main harmonic) or more simply by comparing the signal of the local oscillator to an ideal reference model signal, which is sinusoidal for example, of continuous phase and the sign of which is taken. The comparison will show that there is no phase jump in the result of the modulator with respect to the reference, or in other words the rising and falling edges are, excluding jitter, coincident and in particular at the times when frequency changes during the ramp. The difference between the model and the output of the modulator is solely due to jitter related to the expected performance in respect of phase noise of the modulator, which is typically Gaussian in form and free of aberrations representing phase jumps.

The condition of phase continuity in the transmit local-oscillator signal will now be considered in more depth (the receive local-oscillator signal has the same phase, with the opposite sign):

$$LO_{Tx}(t) = \sum_{n=0}^{N-1} R_T(t-nT)e^{j\omega(n)(t-nT)+j\varphi(n)} \tag{15}$$

For the phase to be continuous, it must be identical at each junction of segments of angular frequency ω(n) at t−nT=T and ω(n+1) at t−(n+1)T=0, which may be written:

$$\omega(n)(T) + \varphi(n) = \omega(n+1)(0) + \varphi(n+1) \tag{16}$$

Namely $$\varphi(n+1) = \varphi(n) + T\omega(n),\ \forall\, n \tag{17}$$

In order for the phase to be restarted at 0 (or at a constant value without loss of generality), the same formulation applies but with the condition:

$$\varphi(n) = 0,\ \forall\, n \tag{18}$$

The output of the receive mixer will now be described assuming an echo received with a delay t such that $$\tau = (\tau - kT) + kT = (\tau \bmod T) + kT \tag{19}$$

This means that if k=0 the echo is received in the PRP and if k>0 the echo is received beyond the PRP. Assuming phase scrambling b(n), the following is obtained:

$$SM(t) = \sum_{n=0}^{N-1} b(n)\overline{b(n+k)} \cdot p_0(t-nT-\tau)e^{j\omega(n)(t-nT-\tau)+j\varphi(n)}e^{j\omega(n+k)(t-(n+k)T)+j\varphi(n+k)} \tag{20}$$

The impact of phase scrambling has already been examined. Therefore here on the value of the IF angular frequency (i.e. at the intermediate frequency) will be focused on, in order to highlight the impact of the continuity or reset of the phase. To simplify, it will be assumed that the pulse is of infinite bandwidth, i.e. a Dirac pulse, which amounts to "sampling" the output of the mixture by the pulse then at the optimal times of presence of these pulses, which is equivalent to writing:

$$SM(t) = \sum_{n=0}^{N-1} b(n)\overline{b(n+k)} \cdot \delta(t-nT-\tau)e^{j\omega(n)(t-nT-\tau)+j\varphi(n)}e^{-j\omega(n+k)(t-(n+k)T)-j\varphi(n+k)} \tag{21}$$

This simplifies to $$m(t) = \sum_{n=0}^{N-1} b(n)\overline{b(n+k)} \cdot \delta(t-nT-\tau)e^{j\psi(n)} \tag{22}$$

The following phase term is considered:

$$\psi(n) = \omega(n)(t-nT-\tau) + \varphi(n) - j\omega(n+k)(t-(n+k)T) - \varphi(n+k) \tag{23}$$

with t−nT−τ=0, it becomes:

$$\psi(n) = \varphi(n) - \varphi(n+k) - \omega(n+k)(\tau - kT) \tag{24}$$

The IF angular frequency of the sample may be defined n+1 as:

$$\omega_{IF}(n+1) = \frac{\psi(n+1)-\psi(n)}{T} = \frac{\varphi(n+1)-\varphi(n)}{T} - \frac{\varphi(n+k+1)-\varphi(n+k)}{T} - \frac{\omega(n+k+1)-\omega(n+k)}{T}(\tau - kT) \tag{25}$$

And if the frequency ramp is ideal, then:

$$\omega(n) = \omega_m + \frac{n}{N}2\pi B_{chirp} = \omega_m + n2\pi\alpha T = \omega_m + n\alpha_r T \tag{26}$$

In the case where the phase is reset the following is valid:

$$\omega_{IF,0}(n+1) = -\frac{\omega(n+k+1)-\omega(n+k)}{T}(\tau - kT) \tag{27}$$

With an ideal frequency ramp, a constant IF angular frequency is obtained:

$$\omega_{IF,0}(n+1) = \omega_{IF,0} = -\alpha_r(\tau \bmod T) \tag{28}$$

The IF corresponds to the delay modulo PRP multiplied by a.

In the case where the phase is continuous the following is valid:

$$\omega_{IF}(n+1) = \omega(n) - \omega(n+k) - \frac{\omega(n+k+1) - \omega(n+k)}{T}(\tau - kT) \tag{29}$$

With an ideal frequency ramp, a constant IF angular frequency is obtained:

$$\omega_{IF,c}(n+1) = \omega_{IF,c} = -\alpha_r kT - \alpha_r(\tau - kT) = -\alpha_r \tau \tag{30}$$

The IF corresponds to the delay multiplied by a as in the conventional FMCW case.

Lastly, since the result is sampled at the period T, a spectrum of IF lines spaced apart by 1/T is indeed obtained, and therefore a copy of the IFs calculated above every 1/T that may lead to ambiguities in the band]

$$-\frac{1}{T}, 0]$$

(because here the IF is negative with α>0) if:

τ>T in the case of constant phase by construction (modulo): the IF is in the interval]−αT,0]

τ>2T in the case of continuous phase because of copies due to sampling: the IF is in the interval]−2αT,0].

In other words, as long as the delays of the echoes do not exceed T, there is no real difference between the case where phase is continuous and the case where phase is reset on each pulse.

Figure 8:
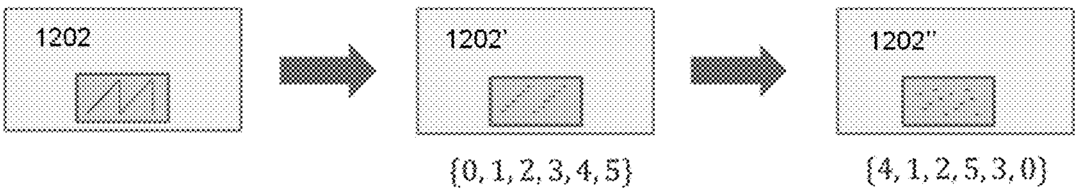
FIG. 8 shows three different types of local-oscillator control signals.

Up to now, the case where the oscillator control signal generated by the device 1202 was an increasing or decreasing linear ramp has been considered. In fact, the frequency excursion must be bounded, so the control signal will rather be a sawtooth signal or a triangular signal (alternation of an increasing ramp and a decreasing ramp). Since the frequency of the oscillator preferably takes different discrete values each time the oscillator is triggered, the control signal may also exhibit a stepwise variation. In FIG. 8, the reference 1202' designates a device for generating such a stepwise linear control signal. The values taken by the control voltage of the oscillator have been designated by integers from 0 to 5; therefore, a stepwise linear ramp corresponds to the sequence {0, 1, 2, 3, 4, 5}. According to one alternative embodiment of the invention, these discrete values may be subjected to scrambling, which results in frequency scrambling of the radar signal; in FIG. 8, the reference 1202" designates a device for generating such a control signal, corresponding to the sequence {4, 1, 2, 5, 3, 0}. As a variant, certain values may be omitted, for example the frequency {4, 1, 5, 3, 0} may be used. Under these conditions, a graph of the variation in frequency as a function of time is no longer a straight line or a staircase; however, the frequency values belong to a straight line. These points are not necessarily equidistant, and some may be missing.

The main advantage of this variant relates to problems due to coexistence with other radar of the same type, or to security (sequence not known to an attacker and modifiable at will). Another advantage is the ability to transmit through a number of antennas (MIMO operation, MIMO standing for Multiple Input-Multiple Output) using orthogonal frequency-hopping sequences for each antenna. By doing so, it is possible to transmit simultaneously in a plurality of frequency sub-bands in parallel and each receive channel collects only results that are in correlation with the sequence of its corresponding transmitter.

Figure 9:
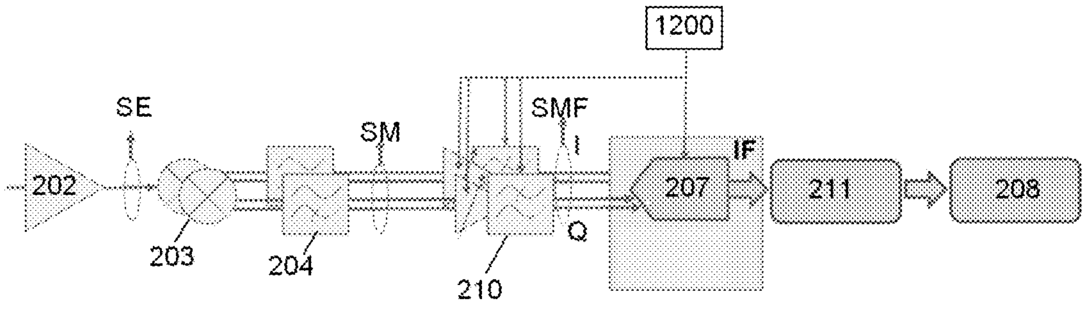
FIG. 9 shows the functional schematic of the receive channel of a device according to a third embodiment of the invention.

The difficulty caused by frequency scrambling is the need to compensate for it in the receiver, as otherwise the mixing signal will be unobtainable because of random phase jumps between the low-frequency components of the mixing signal corresponding to successive pulses. This compensation cannot be carried out in the analog domain. To achieve it in the digital domain without having to increase the acquisition rate of the analog-to-digital converter 207 very substantially, it is possible to implement the low-pass filtering by means of a windowed integrator 210 driven by the clock signal, as illustrated in FIG. 9. Since the integrator is zeroed each time the local oscillator is reset, each digitized sample contains payload information, low-pass filtered by the integrator over a time $PRP_n$. A descrambling module 211 applies to the samples the permutation that returns them to the "right" order (the order in which the frequency of the oscillator signal varies linearly).

Figure 10:
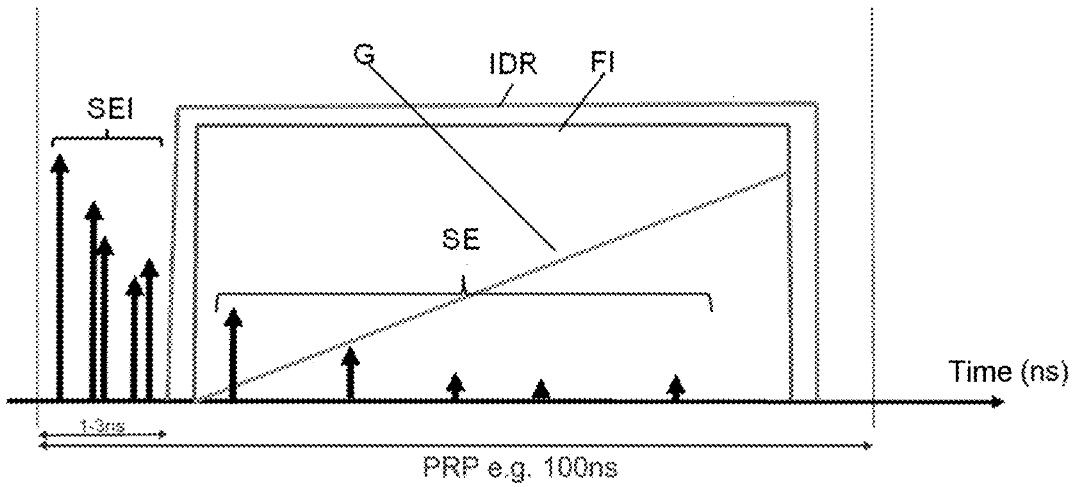
FIG. 10 and FIG. 11 show use of a windowed integrator to simultaneously perform low-pass filtering, gain profiling and removal of unwanted signals.

Even independently of the case of frequency scrambling, use of a windowed integrator may prove advantageous because such a device may replace, in whole or in part, the variable gain amplifier 205 or even the high-pass filter 204. Specifically, as illustrated in FIG. 10, the integrator has an integration gain G that may vary in a predefined or adaptive way to compensate for variations in the strength of the echoes received from various targets. The example in FIG. 10 corresponds to the case where the echo signal is made up of reflections from targets of substantially equivalent radar cross sections, but located at different distances. In this case, later reflections are in general weaker because they undergo greater attenuation, which may be compensated for by an increasing integration gain G inside the integration window FI. Furthermore, unwanted signals SEI intended to be removed by the high-pass filter 204 reach the receive channel very early, because they are mainly due to direct coupling with the transmitter. These signals may therefore be removed, at least in part, by shifting the start of the integration window by a few nanoseconds with respect to the start of the period PRP.

The temporal profile of the integration gain may be introduced, cumulatively or alternatively, at a number of stages in the integration pipeline:

in the low-noise amplifier 202;

in the variable gain amplifier 205;

in the receive pulse shaper 201;

in the receive mixer 203;

in the integrator.

Figure 11:
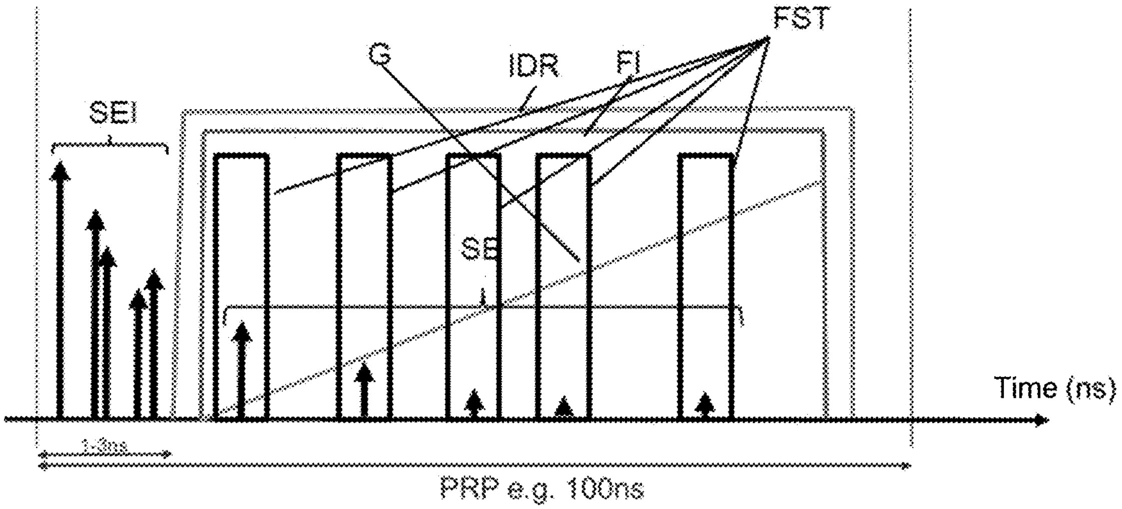

The temporal gain profile, in particular when it is introduced, at least in part, in the receive pulse shaper 201, in the receive mixer 203 or in the integrator, may also apply on-off keying (OOK) so as to retain only time ranges in which useful echoes are found. This is illustrated in FIG. 11, where the receive signal is weighted via the integration window FI, the gain G increases linearly in time and the selection time windows FST, which are centered on the echoes, are for example obtained by OOK modulation of the receive pulse shaper.

The positioning of selection time windows FST may be obtained by prior learning of the channel.

Figure 12:
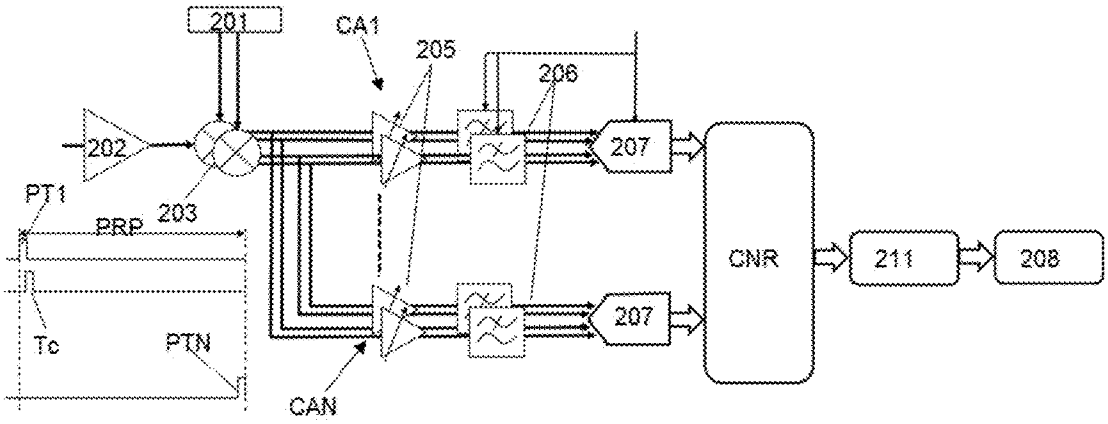
FIG. 12 shows a parallel receive channel according to another embodiment of the invention.

In one alternative embodiment, illustrated in FIG. 12, the whole part of the receive channel located downstream of the mixer 203 or of the high-pass filter 2024 is parallelized in N>1 acquisition pipelines CA1-CAN. This makes it possible to divide the time PRP into N smaller intervals of duration Tc such that NTc=PRP. A simple option is therefore to have non-overlapping and contiguous time gates PT1-PTN for each acquisition pipeline. The gain profile may then be applied in steps of duration Tc and therefore remain constant in each of the parallel acquisition pipelines. The N analog-to-digital converters 207-1-207-N will therefore deliver results of integration over Tc and not over PRP. Therefore, the integration over PRP is simply the sum of the N outputs of the converters, which is determined by a digital combiner circuit CNR.

It is also possible to sample the signal at the rate Tc and not PRP by interleaving the samples output from the various converters rather than summing them. This may be advantageous, in particular during a phase of learning of the channel, as it allows the acquisition rate to be increased at the expense of higher consumption, before returning to sparser operation (sampling at the PRP rate) in normal operation.

If the relationship PRP=N*Tc is unobtainable, it is still possible to achieve advantageous configurations with N*Tc a multiple or submultiple of PRP. If for example PRP=K*N*Tc with K an integer greater than 1, each of the parallel acquisition channels must intervene K times in one PRP; its gain profile must then, in general, vary over time by taking up to K different values. In the case where PRP=N*Tc/K, K acquisition pipelines intervene in each interval of duration Tc, this potentially proving a useful way of improving signal-to-noise ratio as it allows coherent integration over said intervals.

In FIG. 12, the reference CNR designates the digital circuit for recombining the outputs of the analog-to-digital converters in general, irrespectively of whether the recombination is a sum, interleaving or another more complex operation.

The invention has been described with reference to particular embodiments, but variants are possible. For example, it is not essential to generate two signal components I and Q (but advantageous because it allows acquisition rate to be decreased). Likewise, the frequency and time ranges indicated are given merely by way of non-limiting example. Moreover, the use of two components in quadrature is not essential; if only the I component is used, the combiner 102 is not necessary.

Two examples of embodiments of pulse shapers have been provided, but other solutions that may be suitable for implementing the invention are known in the prior art. Mention may for example be made of (Singh 2021), (Bechtum 2023), and EP 3 790 188. The prior art, however, essentially targets communication-related applications, in which the "oscillator" and "pulse shaping" functionalities are optimized jointly. This is not the case in radar applications, where the constraints on the phase noise of the oscillator are stricter and it must operate almost constantly so as to allow it to be used in reception. The pulse-shaping specifications are however similar in both applications.

Various technologies may be suitable for implementing the local oscillator, taking into account the fact that phase noise and drift are critical parameters. A first possibility is to use an injection-locked ring oscillator (ILRO) as disclosed by (Singh 2021), a radio-frequency digitally controlled oscillator (RFDCO) as in (Bechtum 2023), or indeed a free voltage-control LC oscillator as in FR 3 015 153. In any case, the oscillator must be able to be calibrated to deliver in principle a frequency close to the desired frequency, and restarted on each pulse to apply a frequency change. The drift of the oscillator over the time separating the transmitted pulse and the received echo corresponding to the maximum distance must be limited, as otherwise performance will be degraded. In contrast, the fact that the initial phase of each pulse is controlled and thus allows coherent processing of the pulses is not essential, or in any case not in an interval between two pulses. It is also possible to use a direct frequency modulator as in EP 3 790 188. The common feature of these different approaches is a very fast latching time to a new frequency because the oscillators are not placed in phase-locked loops (PLL). The fundamental advantage of the direct frequency modulator is that it achieves an almost instantaneous transition between two consecutive frequency values, while maintaining phase continuity.

Figure 13:
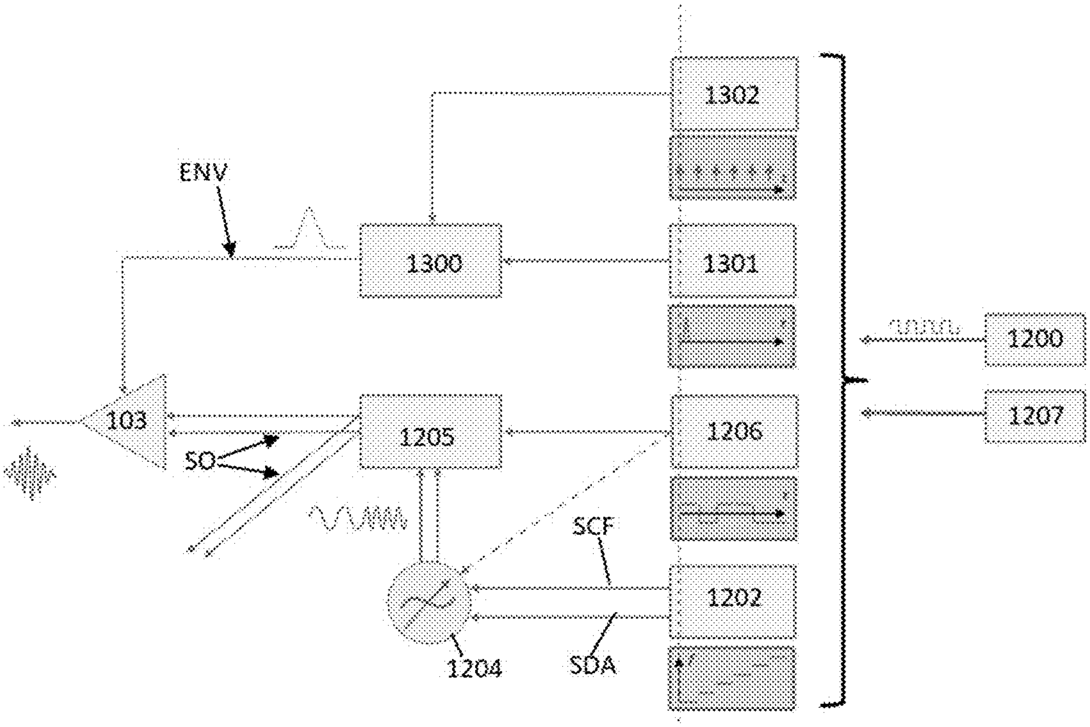
FIG. 13, FIG. 14, FIG. 15, FIG. 16 show functional schematics of devices according to other embodiments of the invention.

FIG. 13 illustrates an alternative embodiment of a transmit channel of a device according to the invention in which the transmit pulses are shaped by mixing, by means of a mixer 1100 arranged at the input of the power amplifier 103, an envelope signal ENV and the oscillator signal SO. The oscillator signal SO—which comprises two quadrature components I and Q—is also delivered to a receive pulse shaper (not shown), generally of the "on-off" type.

The oscillator signal SO is generated by a voltage-controlled LC local oscillator 1204 (for example as described in FR 3 015 153), driven by the control-signal generator 1202, which determines the (for example, step-wise linear) variation as a function of time in its oscillation frequency by means of a signal SCF and generates a signal SDA for restarting the oscillator. The phase scrambler 1205 consists of a polarity selector 1206 that is driven by a generator 1206 of polarity-control signals so to invert, at predefined times, the polarity of the signal SO. As a variant, the polarity-control signals generated by the block 1206 may be delivered directly to the oscillator 1204 to determine its starting polarity (dashed line in the figure); in this case, the polarity selector 1205 may not be necessary.

It will be noted that, if the polarity selector 1205 is present, it is possible to direct the signal output by the oscillator 1204 directly to the receive channel, in which case the receive polarity control will be processed digitally.

As a variant, the local oscillator 1204 may operate continuously.

The envelope signal is generated by an envelope-generator module 1300, which receives as input an envelope shape from a module 1301 and a trigger pulse generated by a module 1302.

Synchronous activation of the elements 1301, 1302, 1202, 1206, represented schematically by a vertical dashed line passing through the modules, is ensured by a clock signal generated by the local clock 1200. The waveform (frequency, envelope, polarity) is determined by a configuration module 1207, also arranged at the input of the elements 1301, 1302, 1202, 1206.

Figure 14:
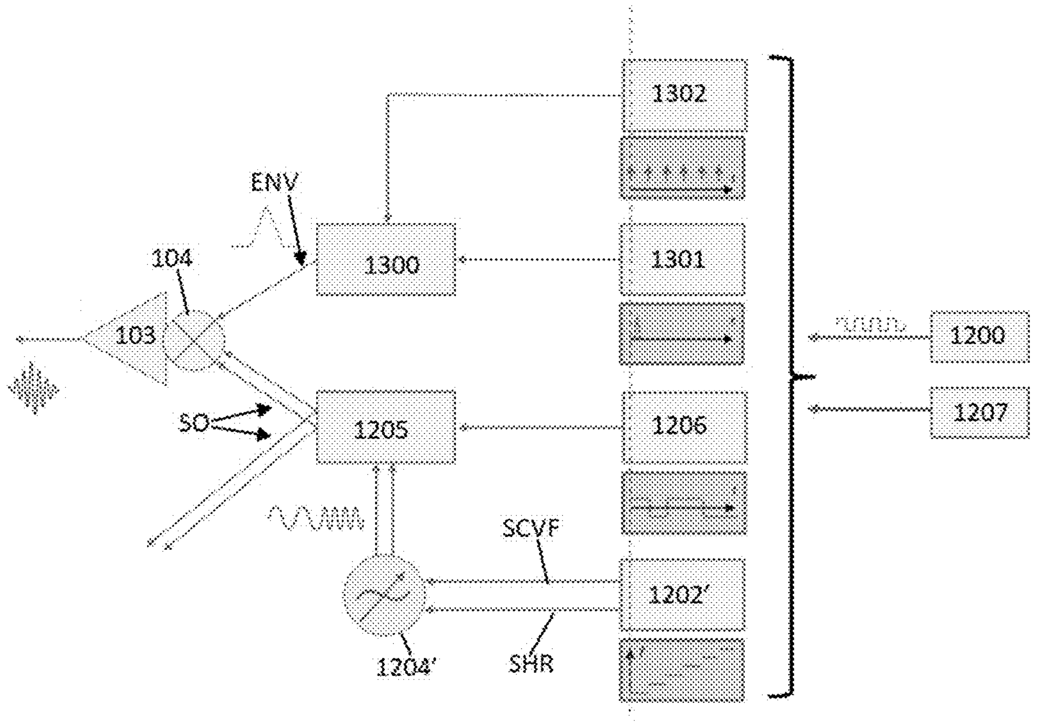

In the embodiment of FIG. 14, the variable frequency local oscillator is based on a direct frequency modulator 1204', as described in EP 3 790 188. This modulator works continuously, and hence there is no trigger signal. It receives as input a signal SCVF that determines the variation in the frequency of the signal SO and a reference clock signal SHR, which are generated by the control-signal generator block 1202'.

Figure 15:
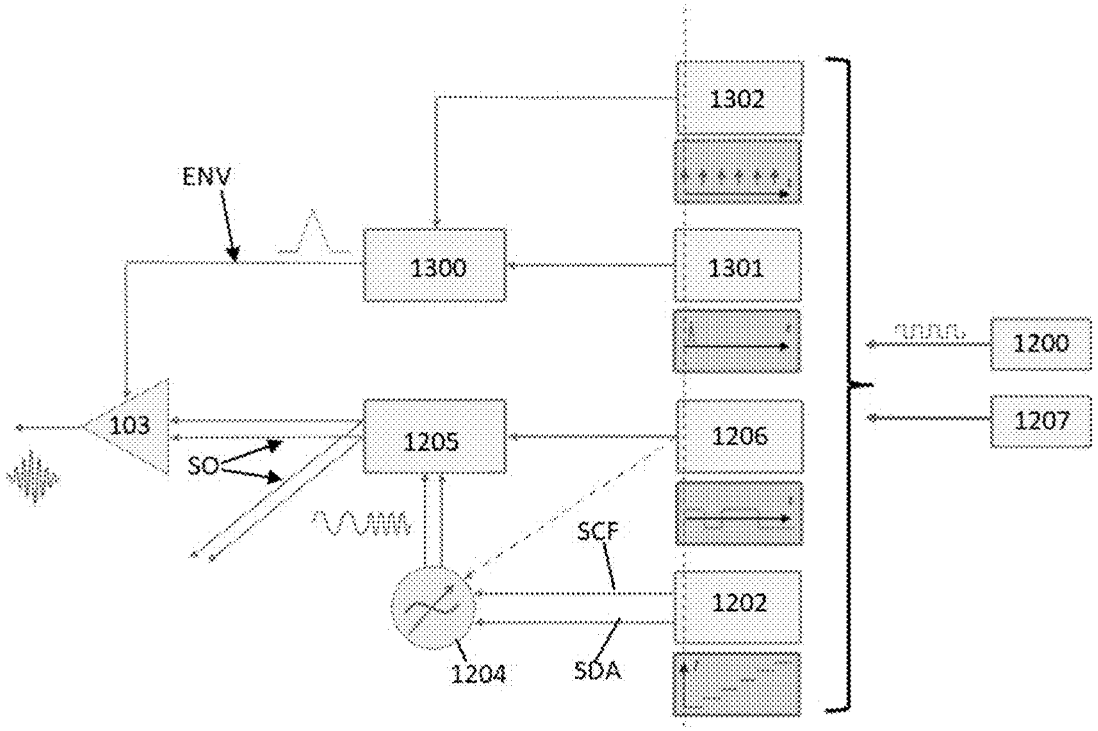
Figure 16:
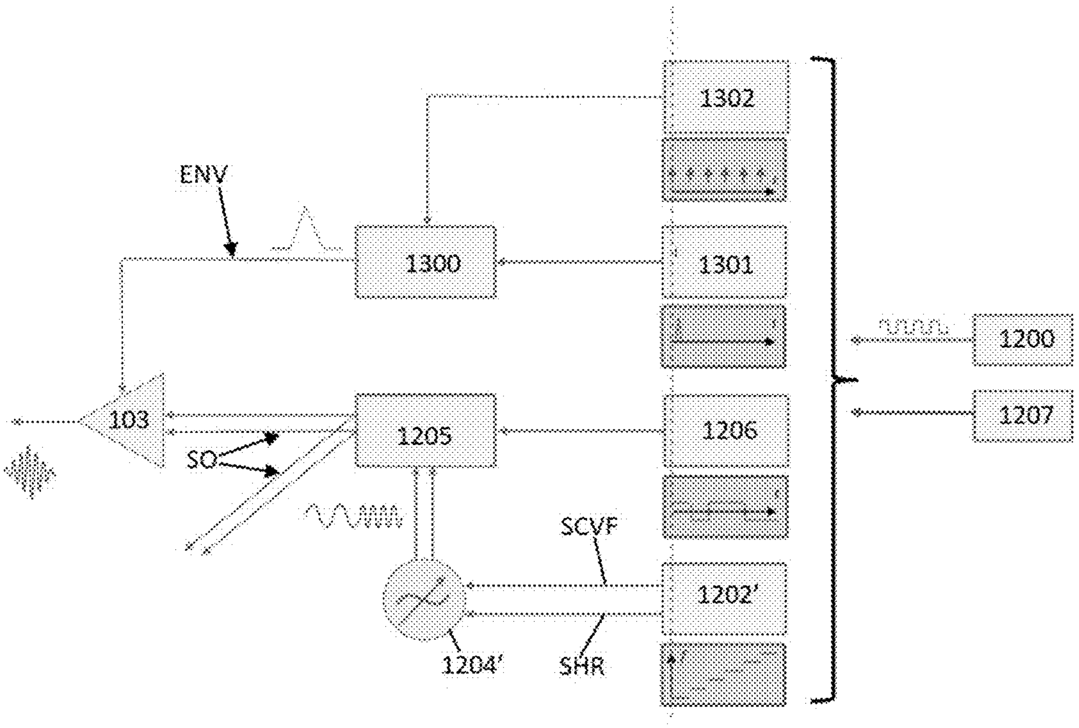

FIG. 15 and FIG. 16 represent embodiments similar to those of FIG. 13 and FIG. 14, respectively, except that only the oscillator signal OSC is delivered as input to the power amplifier 103, the envelope signal ENV being used to control the gain of said amplifier. In these embodiments, the power amplifier 103 is preferably digital.

The condition duration (IE)<<duration (IDR) is not essential. Ultimately, it is even possible for the two pulses to have the same duration.

In certain embodiments, in particular embodiments operating at THz (terahertz) frequencies, the low-noise amplifier 202 at the input of the receive channel may be omitted.

In the presence of time scrambling of the PRP, the analog-to-digital converter 207 and/or the optional windowed integrator 210 may be driven by the scrambled clock signal. However, this is not essential because the frequency of the filtered mixing signal depends only on the delay between the echo signal and the receive demodulation pulse, and is therefore not affected by any time scrambling.

The processor 208 and, where appropriate, the frequency-descrambling means 211 may be implemented by means of dedicated digital integrated circuits (FPGA, ASIC) or, more advantageously, a microprocessor programmed in an opportune manner. In the latter case, the frequency-descrambling means 211 may be implemented by software.

The invention is particularly suitable for the production of "SoC" radars in which the radar device (or at least the transmit channel and/or the acquisition channel) are/is monolithically integrated, but it is not limited to this particular case.

REFERENCES (Antide 2020) E. Antide, M. Zarudniev, O. Michel et M. Pelissier, "Comparative Study of Radar Architectures for Human Vital Signs Measurement," 2020 IEEE Radar Conference (RadarConf20), Florence, Italy, 2020, pp. 1-6, doi: 10.1109/RadarConf2043947.2020.9266569.

(Liu 209) Y.-H. Liu et al., "9.3 A680 μW Burst-Chirp UWB Radar Transceiver for Vital Signs and Occupancy Sensing up to 15m Distance," 2019 IEEE International Solid-State Circuits Conference-(ISSCC), San Francisco, CA, USA, 2019, pp. 166-168, doi: 10.1109/ISSCC.2019.8662536.

(Andersen 2017) N. Andersen et al., "A 118-mW Pulse-Based Radar SoC in 55-nm CMOS for Non-Contact Human Vital Signs Detection," in *IEEE Journal of Solid-State Circuits*, vol. 52, no. 12, pp. 3421-3433 December 2017, doi: 10.1109/JSSC.2017.2764051.

(Siligaris 2023) Siligaris, A., Bossuet, A., Barrau, L., Antide, E., Gonzalez-Jimenez, J. L., Dehos, C., & Zarudniev, M. (2023 September). Fast Chirping 58-64 GHz FMCW Radar Transceiver using D-PROT Multiplier in CMOS 45 nm RFSOI for vital signs Detection, *ESSCIRC* 2023-*IEEE* 49*th European Solid State circuits Conference* (*ESSCIRC*) (pp. 505-508). IEEE.

(Eisenburger 2008) Eisenburger D. Krellmann Y., Lentz H., Trilzsch G.

Stepped-Frequency Radar System in Gating Mode: an Experiment as a New Helicopter-Borne GPR System for Geological Applications, IGARSS 2008-2088 IEEE International Symposium on Geoscience and Remote Sensing, Boston.

(Bechtum 2023). Bechthum et al., "A 380 μW IEEE 802.15.4z IR-UWB pulse-mixing transmitter featuring enable-locking RFDCO with extensive duty-cycling in 22 nm FDSOI," ESSCIRC 2023-IEEE 49th European Solid State Circuits Conference (ESSCIRC), Lisbon, Portugal, 2023, pp. 45-48

(Singh 2021). Singh et al., "An IR-UWB IEEE 802.15.4z Compatible Coherent Asynchronous Polar Transmitter in 28-nm CMOS," in IEEE Journal of Solid-State Circuits, vol. 56, no. 12, pp. 3799-3810 December 2021

The invention claimed is:

1. A radar device comprising:

a transmit channel configured to generate a radar signal; and a receive channel configured to receive echoes of said radar signal and to demodulate them synchronously with their generation so as to extract time-of-flight information therefrom;

in which device the transmit channel and the receive channel comprise:

a shared local oscillator having a frequency that varies as a function of a control signal;

a generator of said control signal, configured so that the frequency of said local oscillator varies in time linearly, or varies stepwise linearly from one pulse to another, or takes a plurality of discrete values obtainable by scrambling a stepwise linear variation from one pulse to another; and means for shaping a signal generated by said local oscillator at said variable frequency, said means being configured to generate a series of transmit pulses forming said radar signal and a corresponding series of receive demodulation pulses, each receive demodulation pulse having a duration greater than or equal to the duration of the corresponding transmit pulse and defining a respective time range of echo reception;

said receive channel further comprising a mixer configured to receive as input said echoes of said radar signal and one of said receive demodulation pulses) and to deliver as output a mixing signal; wherein:

said receive channel also comprises a low-pass filter configured to filter said mixing signal by extracting its first harmonic component and an analog-to-digital converter for converting the filtered mixing signal to digital format.

2. The radar device according to claim 1, wherein the shaping means comprise:

a first pulse shaper that belongs to said transmit channel and that is configured to receive as input said signal generated by said local oscillator at said variable frequency and to deliver to its output said transmit pulses; and a second pulse shaper that belongs to said receive channel and that is configured to receive as input said signal generated by said local oscillator at said variable frequency and to deliver to its output said receive demodulation pulses.

3. The radar device according to claim 1, comprising a driver of said local oscillator, configured to restart said local oscillator each time a transmit pulse and the corresponding receive demodulation pulse are generated.

4. The radar device according to claim 3, wherein the shaping means comprise:

said driver of said local oscillator, which is configured to shape rising edges of the signal generated by the latter at said variable frequency; and a device for shaping falling edges, which is arranged on said transmit channel and configured to receive as input said signal generated by said local oscillator at said variable frequency and to deliver to its output said transmit pulses;

said device for shaping falling edges also being configured to generate a reset signal for said local oscillator.

5. The radar device according to claim 3, also comprising a pulse-repetition-period scrambler configured to control said driver of the local oscillator so as to vary the interval between two successive restarts of said local oscillator pseudo-randomly.

6. The radar device according to claim 1, also comprising a phase scrambler for applying the same phase scrambling to the transmit pulses and to the receive demodulation pulses.

7. The radar device according to claim 1, wherein said low-pass filter comprises a windowed integrator, configured to integrate said mixing signal over successive integration time windows, each said integration time window being contained in the time range of echo reception defined by a said receive demodulation pulse, and to be reset at the end of said integration window.

8. The radar device according to claim 7, wherein said windowed integrator has an integration gain that varies as a function of time in a predetermined or adaptive manner.

9. The radar device according to claim 7, wherein said generator of the control signal is configured so that the frequency of said local oscillator varies in time such as to take a plurality of discrete values obtainable by scrambling a stepwise linear variation; and wherein the receive channel further comprises a means for frequency descrambling the filtered mixing signal converted to digital format.

10. The radar device according to claim 1, wherein the receive channel comprises an amplifier equipped with an automatic gain control device for compensating for variations in the strength of the received echoes.

11. The radar device according to claim 1, wherein said local oscillator is a microwave oscillator.

12. The radar device according to claim 1, wherein the receive channel comprises a plurality of parallel acquisition pipelines, each comprising an analog-to-digital converter, the receive channel also comprising a digital means for recombining the outputs of said analog-to-digital converters.

* * * * *